United States Patent
Shavit et al.

(10) Patent No.: US 11,678,199 B2
(45) Date of Patent: Jun. 13, 2023

(54) AUDIO STREAM IDENTIFICATION BY A WIRELESS NETWORK CONTROLLER

(71) Applicant: TEXAS INSTRUMENTS INCORPORATED, Dallas, TX (US)

(72) Inventors: Yonathan Shavit, Kfar Saba (IL); Alon Cheifetz, Moshav Yanuv (IL); Alon Paycher, Dallas, TX (US); Dotan Ziv, Tel Aviv (IL)

(73) Assignee: TEXAS INSTRUMENTS INCORPORATED, Dallas, TX (US)

( * ) Notice: Subject to any disclaimer, the term of this patent is extended or adjusted under 35 U.S.C. 154(b) by 0 days.

(21) Appl. No.: 17/492,188

(22) Filed: Oct. 1, 2021

(65) Prior Publication Data
US 2022/0086655 A1 Mar. 17, 2022

Related U.S. Application Data

(63) Continuation of application No. 14/307,764, filed on Jun. 18, 2014, now Pat. No. 11,166,167.

(51) Int. Cl.
*H04W 72/04* (2023.01)
*H04W 16/14* (2009.01)
(Continued)

(52) U.S. Cl.
CPC ............ *H04W 16/14* (2013.01); *H04L 69/22* (2013.01); *H04W 12/08* (2013.01); *H04W 72/04* (2013.01);
(Continued)

(58) Field of Classification Search
CPC .... H04L 63/0227; H04L 69/22; H04W 12/08; H04W 16/14; H04W 48/18; H04W 72/04; H04W 84/12; H04W 84/18; H04W 88/06
(Continued)

(56) References Cited

U.S. PATENT DOCUMENTS

| | | | | |
|---|---|---|---|---|
| 6,639,915 B1* | 10/2003 | Tsztoo | ................ | H04M 7/006 370/395.7 |
| 7,369,532 B2* | 5/2008 | Silvester | ............... | H04W 76/15 370/349 |

(Continued)

FOREIGN PATENT DOCUMENTS

| | | |
|---|---|---|
| CN | 101940020 A | 1/2011 |
| CN | 102378413 A | 3/2012 |

(Continued)

*Primary Examiner* — Robert J Lopata
(74) *Attorney, Agent, or Firm* — Mandy Barsilai Fernandez; Frank D. Cimino

(57) ABSTRACT

An apparatus and method for transmitting audio with coexisting wireless networks. In one embodiment, a wireless device includes a first wireless network controller and a second wireless network controller. The first wireless network controller and the second wireless network controller are configured to access a wireless communication medium via a shared antenna, and to transmit, via the wireless communication medium, data received from a host device. The second wireless network controller includes an audio stream detector configured to determine, based on the contents of the data received from the host device, whether an audio stream is to be transmitted via the second wireless network controller, and to request that the second wireless network controller be given access priority to the antenna over the first wireless network controller, based on a determination that the audio stream is to be transmitted via the second wireless network controller.

17 Claims, 2 Drawing Sheets

(51) Int. Cl.
  *H04L 69/22* (2022.01)
  *H04W 12/08* (2021.01)
  *H04W 48/18* (2009.01)
  *H04W 84/12* (2009.01)
  *H04L 9/40* (2022.01)
  *H04W 84/18* (2009.01)

(52) U.S. Cl.
  CPC ......... *H04L 63/0227* (2013.01); *H04W 48/18* (2013.01); *H04W 84/12* (2013.01); *H04W 84/18* (2013.01)

(58) Field of Classification Search
  USPC ....................................................... 370/329
  See application file for complete search history.

(56) References Cited

U.S. PATENT DOCUMENTS

| | | | | |
|---|---|---|---|---|
| 8,036,170 B1* | 10/2011 | Tran | ................. | H04W 72/1215 725/98 |
| 8,848,676 B1* | 9/2014 | Wheeler | ............. | H04B 7/0602 370/328 |
| 2001/0006512 A1* | 7/2001 | Takabatake | ......... | H04L 65/1101 370/348 |
| 2003/0119536 A1* | 6/2003 | Hutchison | ............. | H04W 74/00 455/518 |
| 2005/0163087 A1 | 7/2005 | Ianos | | |
| 2007/0049196 A1* | 3/2007 | Hillyard | .............. | H04L 65/1101 455/41.2 |
| 2007/0070961 A1* | 3/2007 | Tao | ...................... | H04W 28/18 370/465 |
| 2007/0098004 A1* | 5/2007 | Lada | ................. | H04W 72/1242 370/437 |
| 2008/0123610 A1* | 5/2008 | Desai | ................... | H04W 28/02 370/339 |
| 2008/0233875 A1* | 9/2008 | Desai | ................... | H04W 16/14 455/41.2 |
| 2008/0279162 A1* | 11/2008 | Desai | ............... | H04W 72/1215 370/338 |
| 2009/0091655 A1* | 4/2009 | Russell | ........... | H04N 21/43072 348/E5.009 |
| 2009/0176454 A1* | 7/2009 | Chen | .................... | H04W 16/14 455/63.1 |
| 2010/0008338 A1* | 1/2010 | Tsfati | .................. | H04B 1/0067 455/41.2 |
| 2010/0062800 A1 | 3/2010 | Gupta et al. | | |
| 2011/0208520 A1* | 8/2011 | Lee | ......................... | G10L 25/78 704/E15.039 |
| 2012/0020348 A1* | 1/2012 | Haverinen | ........ | H04W 72/1215 370/339 |
| 2012/0030357 A1* | 2/2012 | Linsky | .............. | H04W 72/1215 709/226 |
| 2012/0250737 A1* | 10/2012 | Thoukydides | ........ | H04L 1/1829 375/219 |
| 2012/0259440 A1* | 10/2012 | Zhang | ................... | G06F 9/4881 700/94 |
| 2013/0045684 A1* | 2/2013 | Linde | ..................... | H04W 4/80 455/41.2 |
| 2013/0150026 A1 | 6/2013 | Ekici et al. | | |
| 2013/0155926 A1* | 6/2013 | Ly-Gagnon | ....... | H04W 52/0229 370/311 |
| 2014/0016585 A1* | 1/2014 | Lo | ..................... | H04W 72/1215 370/329 |
| 2014/0146676 A1* | 5/2014 | Howes | ................ | H04L 47/2441 370/235 |
| 2014/0221033 A1* | 8/2014 | Xia | ........................ | H04R 27/00 455/515 |
| 2015/0043427 A1* | 2/2015 | K.M. | ..................... | H04W 76/14 370/328 |
| 2015/0186108 A1* | 7/2015 | Miwa | ...................... | G10L 21/00 381/94.1 |
| 2015/0189328 A1* | 7/2015 | Edlis | .................. | H04L 65/4015 375/240.28 |
| 2015/0365208 A1* | 12/2015 | Hyun | ...................... | H04W 4/80 370/310 |

FOREIGN PATENT DOCUMENTS

| | | |
|---|---|---|
| EP | 1583295 A2 | 5/2005 |
| EP | 1780950 A2 | 2/2007 |
| EP | 1583295 A3 | 3/2007 |

* cited by examiner

AUDIO STREAM IDENTIFICATION BY A WIRELESS NETWORK CONTROLLER

CROSS-REFERENCE TO RELATED APPLICATIONS

This application is a continuation of U.S. patent application Ser. No. 14/307,764 filed Jun. 18, 2014, which is incorporated herein by reference in its entirety.

BACKGROUND

As wireless technologies proliferate, mobile wireless devices incorporate systems based on a multiplicity of different wireless standards. For example, a cellular telephone can accommodate a cellular network (e.g., Universal Mobile Telecommunications System), a wireless local area network ("WLAN"), such as network based on the IEEE 802.11 standard, and a wireless personal area network ("WPAN") (e.g., a BLUETOOTH network).

Some of the various wireless standards adopted for use in mobile devices use adjacent and/or overlapping portions of the wireless spectrum. For example, both BLUETOOTH networks and IEEE 802.11b/g/n networks use the 2.45 gigahertz band. In a wireless device that accesses a shared resource, such as spectrum, for use by multiple wireless networks, sharing of the resource should be managed to optimize the experience of a device user.

SUMMARY

An apparatus and method for identifying and transmitting audio in a wireless device supporting coexisting wireless networks is disclosed herein. In one embodiment, a system includes a first wireless network controller, a second wireless network controller, and a host controller. The first wireless network controller is configured to access a first wireless network. The second wireless network controller is configured to access a second wireless network. The host controller electrically coupled to the first wireless network controller and the second wireless network controller. The first wireless network controller is configured to receive a stream of data packets from the host controller, the data packets to be transmitted over the first wireless network, to determine, based on the contents of the packets, whether the packets contain audio data, and to transmit the packets via the first wireless network.

In another embodiment, a wireless device includes a first wireless network controller and a second wireless network controller. The first wireless network controller and the second wireless network controller are configured to access a wireless communication medium via a shared antenna, and to transmit, via the wireless communication medium, data received from a host device. The second wireless network controller includes an audio stream detector configured to determine, based on the contents of the data received from the host device, whether an audio stream is to be transmitted via the second wireless network controller, and to request that the second wireless network controller be given access priority to the antenna over the first wireless network controller, based on a determination that the audio stream is to be transmitted via the second wireless network controller.

In a further embodiment, a method includes receiving, by a first wireless network controller, a data packet for transmission via a first wireless network, and inspecting, by the first wireless network controller, the contents of the packet. Whether the contents of the packet include streaming audio data is determined, via the inspecting, by the first wireless network controller. Arbitration logic that controls access to a wireless communication medium by the first wireless network controller and a second wireless network controller that coexists in a wireless device with the first wireless network controller is notified that streaming audio data is being transmitted by the first wireless network controller.

BRIEF DESCRIPTION OF THE DRAWINGS

For a detailed description of exemplary embodiments of the invention, reference will now be made to the accompanying drawings in which.

NOTATION AND NOMENCLATURE

Figure 1:
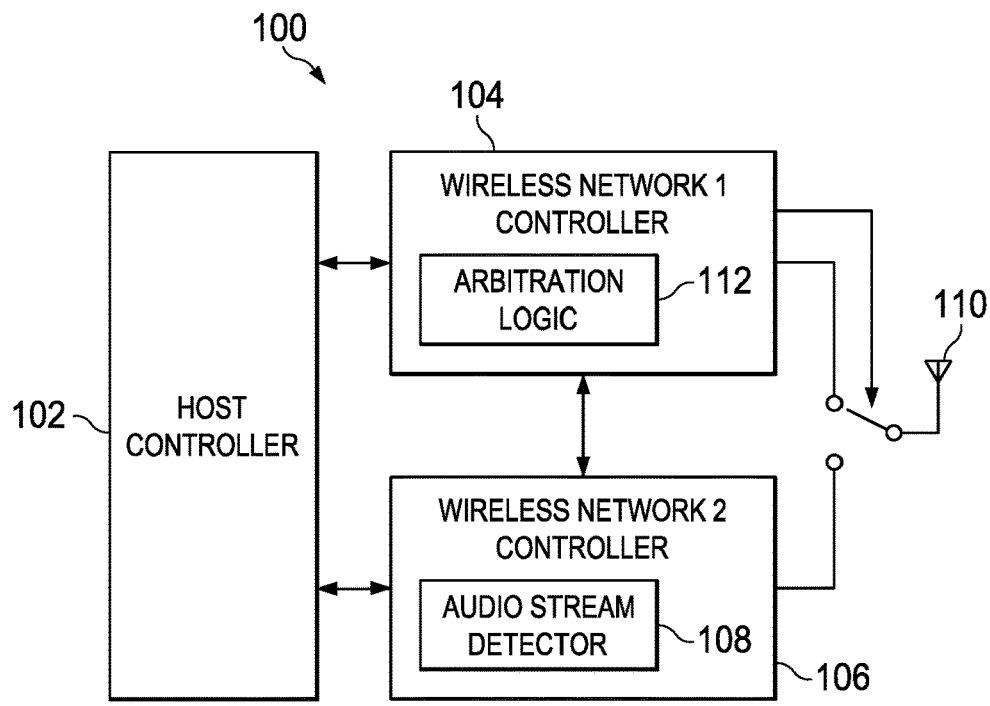
FIG. 1 shows a block diagram of a wireless device that supports coexisting wireless networks and independent identification of audio streams in accordance with various embodiments.

Certain terms are used throughout the following description and claims to refer to particular system components. As one skilled in the art will appreciate, companies may refer to a component by different names. This document does not intend to distinguish between components that differ in name but not function. In the following discussion and in the claims, the terms "including" and "comprising" are used in an open-ended fashion, and thus should be interpreted to mean "including, but not limited to . . . ." Also, the term "couple" or "couples" is intended to mean either an indirect or direct electrical connection. Thus, if a first device couples to a second device, that connection may be through a direct electrical connection, or through an indirect electrical connection via other devices and connections.

DETAILED DESCRIPTION

The following discussion is directed to various embodiments of the invention. Although one or more of these embodiments may be preferred, the embodiments disclosed should not be interpreted, or otherwise used, as limiting the scope of the disclosure, including the claims. In addition, one skilled in the art will understand that the following description has broad application, and the discussion of any embodiment is meant only to be exemplary of that embodiment, and not intended to intimate that the scope of the disclosure, including the claims, is limited to that embodiment.

When a wireless device is capable of transmitting multiple independent and concurrent data streams, priorities may be assigned to the different data streams in accordance with type of data transported by the data stream, time criticality of the data, and/or other factors. Prioritized data deliver is often accomplished by providing a different quality of service based on the different priorities, where higher priorities are assigned a higher quality of service.

Because user experience suffers if streaming audio data is not delivered at sufficient rate, in systems that provide for concurrent transmission of audio streams and other data, an audio stream may be assigned a higher quality of service than data that is not time critical, e.g., file or bulk data transfer. For example, in the BLUETOOTH wireless networking protocol, a dedicated command is provided that allows a channel (e.g., an advanced audio protocol (A2DP) channel) to be configured as guaranteed, where being guaranteed raises the quality of service applied to the channel. Unfortunately, the dedicated command for specifying that a channel be guaranteed is generally not implemented. As a result, in a wireless device that supports coexisting network interfaces, such as BLUETOOTH and IEEE 802.11, an audio stream may be provided insufficient quality of service to ensure timely receipt of audio data, and the user experience is degraded.

Embodiments of the wireless device disclosed herein support coexisting wireless networks, and provide improved audio performance by independently identifying streaming audio without notification from the audio source. When an audio stream is identified, the controllers of the coexisting networks cooperate to ensure that the audio stream is granted access to the resources needed to allow timely wireless transmission of the audio stream.

FIG. 1 shows a block diagram of a wireless device 100 that supports coexisting wireless networks and independent identification of audio streams in accordance with various embodiments. The wireless device 100 includes a host controller 102, a first wireless network controller 104, second wireless network controller 106, and an antenna 110. The host controller 102 manages and provides data handling and processing functionality for the wireless device 100. The host controller 102 may include a processor, storage, and other components for generating data provided to the network controllers 104, 106 for wireless transmission, and receiving data from the network controllers 104, 106 that has been received via the wireless networks supported by the network controllers 104, 106.

The first wireless network controller 104 interfaces the wireless device 100 to a first wireless network. The first wireless network may be, for example, a wireless local area network (WLAN), such as a WLAN in accordance with an IEEE 802.11 standard. The first wireless network controller 104 is coupled to the antenna 110 for transmission and/or reception of data via the first wireless network.

The second wireless network controller 106 interfaces the wireless device 100 to a second wireless network. The second wireless network may be, for example, a wireless personal area network (WPAN), such as a WPAN in accordance with a BLUETOOTH standard. The second wireless network controller 106 is also coupled to the antenna 110 for transmission and/or reception of data via the second wireless network. The first and second wireless network controllers 104, 106 share access to the antenna 110 and may share frequency bands used for wireless data transfer.

The first and second wireless network controllers 104, 106 are communicatively coupled for transfer of information indicative of the type of data, the priority of data, and or the QOS to be applied to data transferred via the first and/or second wireless networks. For example, in the wireless device 100, the first wireless network controller 104 may include arbitration logic 112 that determines which of the network controllers 104, 106 has access to the antenna 110 and the wireless medium. In other embodiments, arbitration logic 112 that determines which of the network controllers 104, 106 has access to the wireless medium may be disposed elsewhere in the wireless device 100. For example, arbitration logic 112 may be separate from the network controllers 104, 106, included in the second wireless network controller 106, etc.

The second wireless network controller 106 includes an audio stream detector 108. The audio stream detector 106 determines whether data transferred to the second wireless network controller 106 from the host controller 102 includes audio data. If audio data is identified, then the second wireless network controller 106 notifies arbitration logic 112 in the first wireless network controller 104, or elsewhere in the wireless device 100 that audio data is being transferred, and that access priority is to be granted to the audio data, etc. Accordingly, in the wireless device 100, QOS needed to properly support wireless audio stream transfer is provided when audio data is identified by the second wireless network controller 106 without a priority request from the host controller 102.

Figure 2:
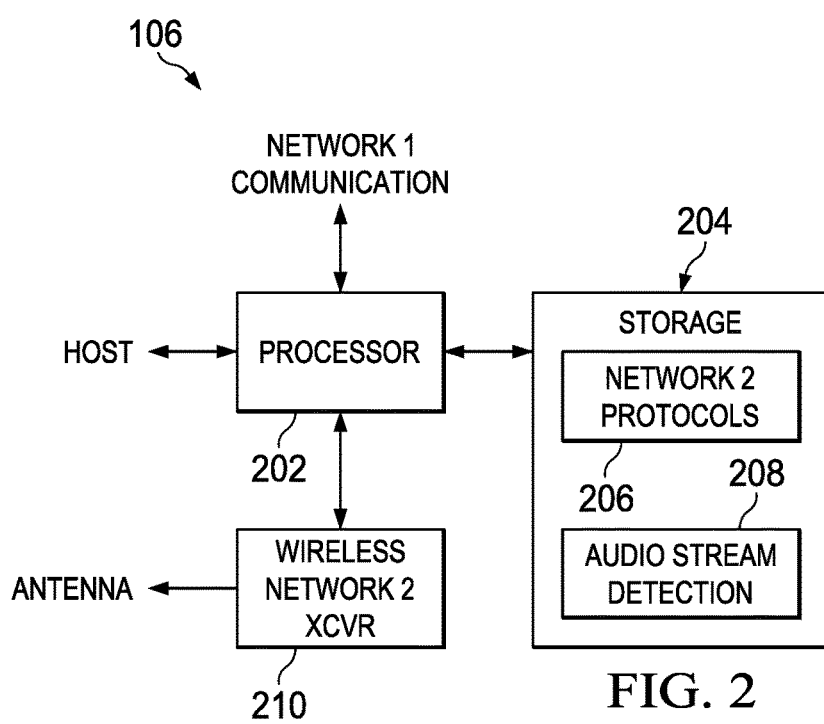
FIG. 2 shows a block diagram of a wireless network controller that supports independent identification of streaming audio data in accordance with various embodiments.

FIG. 2 shows a block diagram of an embodiment of the second wireless network controller 106. The second wireless network controller 106 includes a processor 202, storage 204, and a wireless network transceiver 210 that provides access to the second wireless network. The processor 202 may be a general-purpose microprocessor, digital signal processor, microcontroller, or other device capable of executing instructions retrieved from a computer-readable storage medium. Processor architectures generally include execution units (e.g., fixed point, floating point, integer, etc.), storage (e.g., registers, memory, etc.), instruction decoding, peripherals (e.g., interrupt controllers, timers, direct memory access controllers, etc.), input/output systems (e.g., serial ports, parallel ports, etc.) and various other components and sub-systems.

The wireless network transceiver 210 is coupled to the processor 202. The wireless network transceiver 210 allows the wireless device 100 to access and wirelessly communicate via the second wireless network. For example, the network transceiver 210 may include circuitry that allows the wireless device 100 to access a BLUETOOTH network.

The storage 204 is a non-transitory computer-readable storage medium suitable for storing instructions executable by the processor 202. The storage 204 may include volatile storage such as random access memory, non-volatile storage (e.g., a hard drive, an optical storage device (e.g., CD or DVD), FLASH storage, read-only-memory), or combinations thereof.

The storage 204 includes network protocol instructions 206 that when executed cause the processor 202 to provide the protocols for accessing the second wireless network. For example, the protocol instructions 206 may cause the processor 202 to provide network access protocols in accordance with the BLUETOOTH networking standard.

The storage 204 also includes an audio stream detection module 208. The audio stream detection module 208 includes instructions that cause the processor 202 to inspect the data packets transferred to the wireless network controller 106 from the host controller 102, and to determine whether the data packets contain streaming audio data (i.e., cause the processor 202 to operate as the stream detector 108). For example, the audio stream detection module 208 may cause the processor 202 to identify elements of an A2DP audio stream generated by the host controller 102. In some embodiments, the processor 202 may identify information in a data packet that indicates an audio stream is being started. If the processor 202 determines that an audio stream is being started, then the processor 202 notifies arbitration logic 112 in the wireless device 100 of the audio stream to cause the arbitration logic 112 to grant priority for access to the wireless medium to the network controller 106. In some embodiments, notifying the arbitration logic 112 of the audio stream may include requesting wireless medium access priority, notifying the arbitration logic 112 that high priority data is being transferred, or that a specific QOS is needed for the data transfer.

After an audio stream has been identified by the processor 106, the processor 106 may inspect the data packets transferred to the wireless network controller 106 from the host controller 102, to determine whether the audio stream is to be suspended or terminated. If the processor 202 determines that the audio stream is being suspended, then the processor 202 notifies arbitration logic 112 in the wireless device 100 of the audio stream termination to cause the arbitration logic 112 to relinquish the grant of medium access to priority to the network controller 106.

In some embodiments, the audio stream detector 108 identifies an audio stream by inspecting the content of received data packets and determining, based on the content, whether the packet is (or may be) an A2DP packet. The inspecting of the content may include checking packet headers, packet length, etc.). By inspecting packet content the audio stream detector 108 may identify sub-band coded (SBC) audio, Moving Picture Experts Group Audio Layer 3 (MP3) coded audio, etc. For example, if an inspected header contains values arranged as an all 1s Sync field, Version field, Layer field, Error Protection field, Bit Rate field, and Frequency field of an MP3 header, then the audio stream detector 108 may deem the packet to be part of an MP3 encoded A2DP stream. SBC encoded audio frames may be detected in the manner (i.e., by identifying values corresponding to SBC frame header fields).

In some embodiments, the audio stream detector 108 identifies an audio stream by tracking the BLUETOOTH logical link control and adaptation protocol (L2CAP) signaling channel. The audio stream detector 108 inspects the data transferred from the host 102 to the controller 106, identifies in the data the creation of the L2CAP signaling channel, and identifies, on the L2CAP signaling channel, the commands that start and stop an audio stream.

Figure 3:
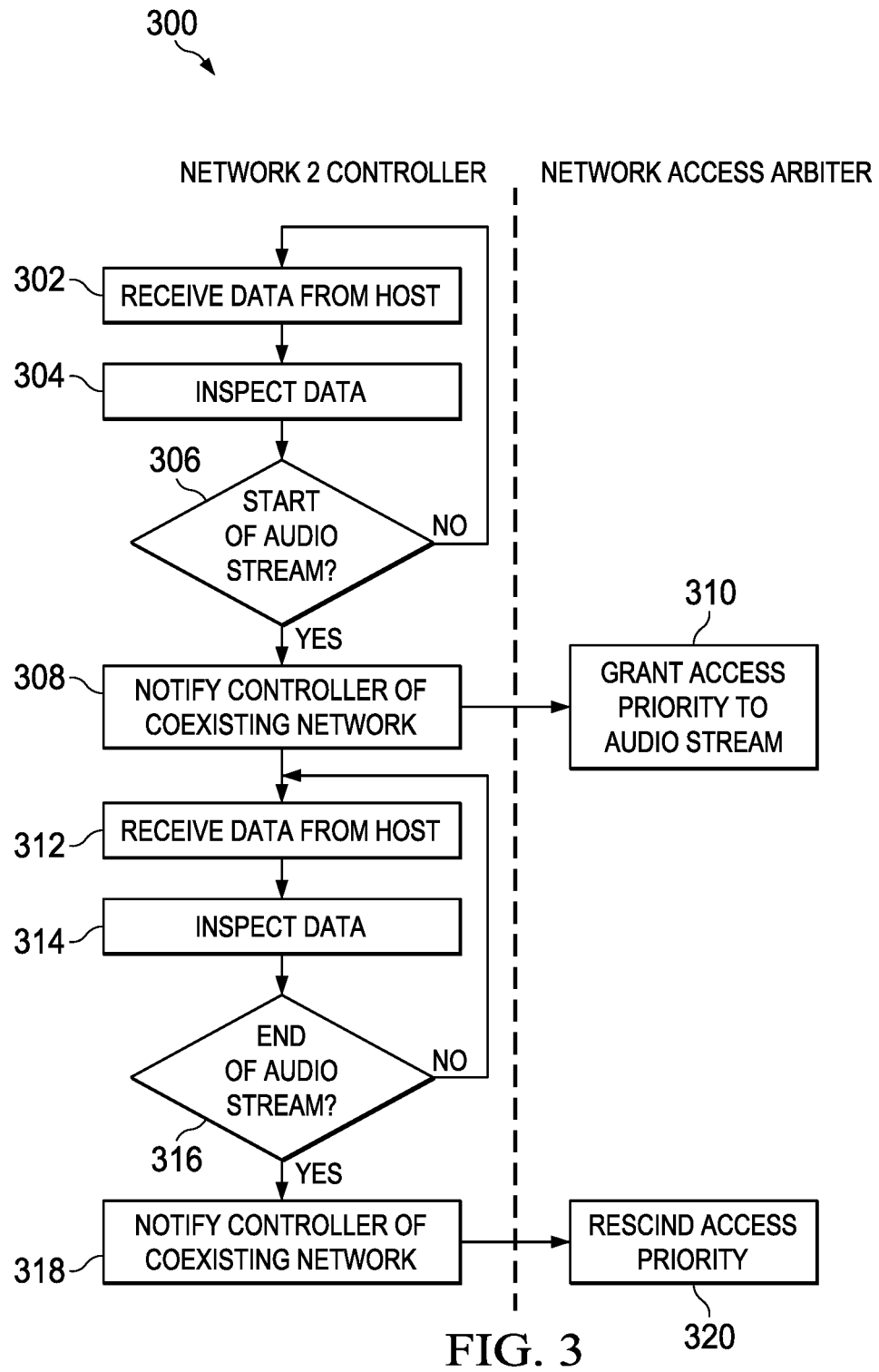
FIG. 3 shows a flow diagram for a method for providing quality of service to an audio stream in a wireless device supporting coexisting wireless networks in accordance with various embodiments.

FIG. 3 shows a flow diagram 300 for a method for providing quality of service to an audio stream in the wireless device 100. Though depicted sequentially as a matter of convenience, at least some of the actions shown can be performed in a different order and/or performed in parallel. Additionally, some embodiments may perform only some of the actions shown. In some embodiments, at least some of the operations of the method 300 can be implemented as instructions stored in a computer readable medium and executed by the processor 202.

In block 302, the second wireless network controller 106 receives data from the host controller 102 to be transmitted via the second wireless network. The host controller 102 may provide no information with regard to the priority or content of the data.

In block 304, the second wireless network controller 106 inspects the content of the data received from the host controller 102. If, in block 306, the second wireless network controller 106 determines that the data indicates that an audio stream is being initiated by the host controller 102, then, in block 308, the second wireless network controller 106 notifies arbitration logic 112 in the wireless device 100 of the need for priority access to the wireless medium so that the audio stream can be delivered with suitable quality of service. As explained above, the second wireless network controller 106 may identify initiation of an audio stream by identifying the audio data itself or by identifying commands that start an audio channel.

In block 310, responsive to the notification, the arbitration logic 112 grants to the second wireless network controller 106 priority to access the wireless medium as needed to stream the audio data. The second wireless network controller 106 transfers the audio stream via the second wireless network in accordance with the access priority granted by the arbitration logic 112.

In block 312, the second wireless network controller 106 receives additional data from the host controller 102. The received data may include streaming audio data.

In block 314, the second wireless network controller 106 inspects the data received from the host controller 102. If, in block 306, the second wireless network controller 106 determines that the data indicates that the audio stream is being suspended by the host controller 102, then, in block 318, the second wireless network controller 106 notifies arbitration logic 112 in the wireless device 100 that priority access to the wireless medium is being relinquished.

In block 320, the arbitration logic 112 rescinds the access priority granted to the second wireless network controller 106.

The above discussion is meant to be illustrative of the principles and various embodiments of the present invention. Numerous variations and modifications will become apparent to those skilled in the art once the above disclosure is fully appreciated. It is intended that the following claims be interpreted to embrace all such variations and modifications.

What is claimed is:

1. A wireless network controller, comprising:
   a transceiver configured to access a wireless network;
   a processor; and
   an audio detection module configured to instruct the processor to:
   receive data packets;
   perform an inspection of the data packets for an indication of an audio stream;
   in response to the indication of the audio stream:
   notify arbitration logic that transmission of the audio stream via the wireless network is being initiated;
   transmit one or more of the data packets of the audio stream on the wireless network via the wireless network controller, wherein the one or more of the data packets of the audio stream are granted higher priority access to the wireless network than non-time-critical data packets;
   determine whether one or more of the data packets includes information indicating that transmission of the audio stream is being suspended;
   notify the arbitration logic that transmission of the audio stream via the wireless network is suspended; and
   revoke the higher priority access to the wireless network for the audio stream.

2. The wireless network controller of claim 1, wherein: the audio stream indication includes a command associated with starting the audio stream.

3. The wireless network controller of claim 2, wherein: the command includes a logical link control and adaptation protocol (L2CAP) message indicating the audio stream is being started.

4. The wireless network controller of claim 1, wherein: the audio stream indication includes data associated with the audio stream.

5. The wireless network controller of claim 4, wherein: the data includes one of Sub-Band Coded (SBC) audio and Moving Picture Experts Group Audio Layer 3 (MP3) audio.

6. The wireless network controller of claim 1, wherein:
the audio stream includes advanced audio protocol (A2DP) packets.

7. The wireless network controller of claim 1, wherein:
the wireless network controller is a first wireless network controller coupled to a second wireless network controller having the arbitration logic; and
the arbitration logic is configured to control access to a wireless communication medium by the first wireless network controller and the second wireless network controller.

8. A wireless system, comprising:
a shared antenna;
a first wireless network controller configured to access a wireless medium via the shared antenna; and
a second wireless network controller coupled to the first wireless network controller;
wherein the second wireless network controller is configured to:
  access the wireless medium via the shared antenna;
  receive data packets from a host device;
  perform an inspection of the data packets for an indication of an audio stream;
  in response to the indication of the audio stream:
    notify arbitration logic that transmission of the audio stream via the wireless medium is being initiated;
    transmit one or more of the data packets of the audio stream on the wireless medium via the second wireless network controller, wherein the one or more of the data packets of the audio stream are granted higher priority access to the wireless medium than non-time-critical data packets;
  determine whether one or more of the data packets includes information indicating that transmission of the audio stream is being suspended by the host device;
  notify the arbitration logic that transmission of the audio stream via the wireless medium is suspended; and
  revoke the higher priority access to the wireless medium for the audio stream.

9. The wireless system of claim 8, wherein:
the audio stream indication includes a command associated with starting the audio stream.

10. The wireless system of claim 9, wherein:
the command includes a logical link control and adaptation protocol (L2CAP) message indicating the audio stream is being started.

11. The wireless system of claim 8, wherein:
the audio stream indication includes data associated with the audio stream.

12. The wireless system of claim 11, wherein:
the data includes one of Sub-Band Coded (SBC) audio and Moving Picture Experts Group Audio Layer 3 (MP3) audio.

13. The wireless system of claim 8, wherein:
the audio stream includes advanced audio protocol (A2DP) packets.

14. The wireless system of claim 8, wherein:
the second wireless network controller includes the arbitration logic; and
the arbitration logic is configured to control access to a wireless communication medium by the first wireless network controller and the second wireless network controller.

15. A method, comprising:
receiving, by a first wireless network controller, data packets for transmission via a wireless network;
inspecting, by the first wireless network controller, the data packets to detect an audio stream;
in response to detecting the audio stream:
  notifying, by arbitration logic that controls access to a wireless communication medium by the first wireless network controller and a second wireless network controller, that the data packets are to be transmitted by the first wireless network controller uninterrupted by any transmission from the second wireless network controller;
determining, by the first wireless network controller, whether one or more of the data packets includes information indicating that transmission of the audio stream is being suspended by a host controller;
notifying, by the first wireless network controller, the arbitration logic that transmission of the audio stream via the wireless network is suspended; and
revoking the higher priority access to the wireless network for the audio stream.

16. The method of claim 15, wherein:
detecting the audio stream comprises detecting an audio stream indication that includes a logical link control and adaptation protocol (L2CAP) message indicating the audio stream is being started.

17. The method of claim 16, wherein:
the data includes one of Sub-Band Coded (SBC) audio and Moving Picture Experts Group Audio Layer 3 (MP3) audio.

* * * * *